July 12, 1938.  G. GOTTLIEB  2,123,674
PROPORTIONAL SCALE
Filed June 27, 1936
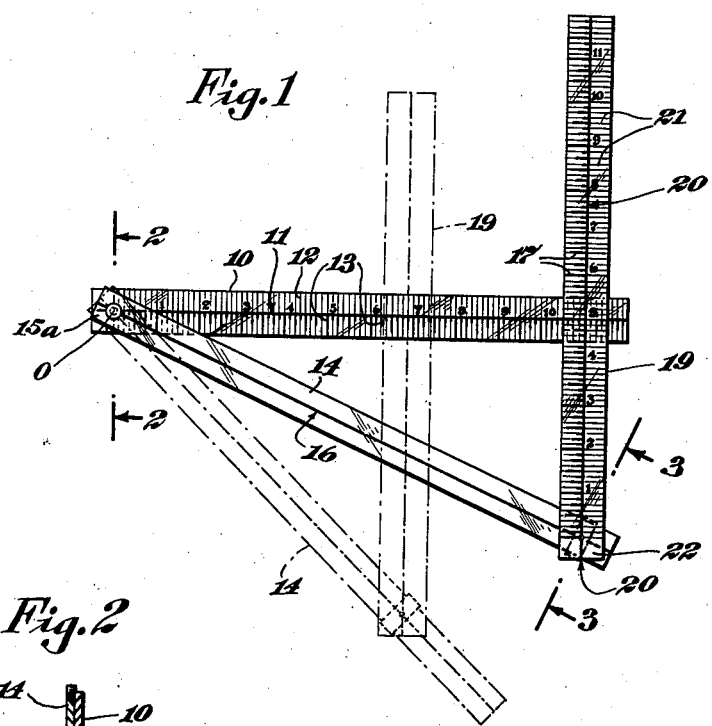
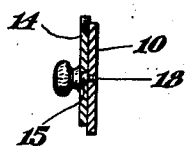
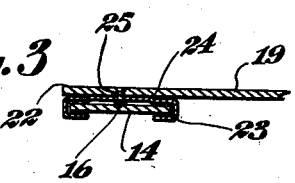
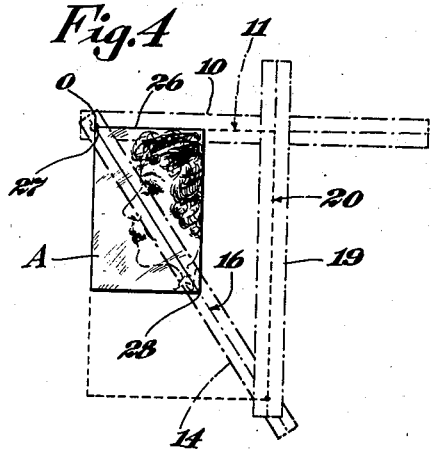
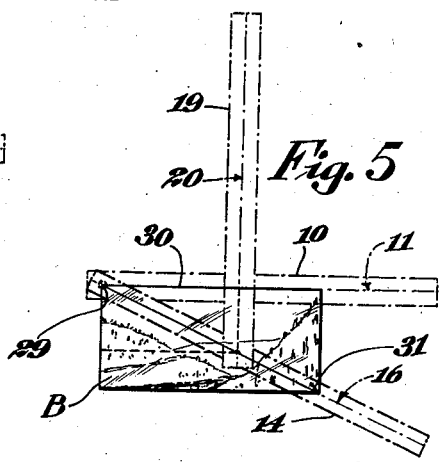
INVENTOR,
Gerald Gottlieb,
BY
HIS ATTORNEY.

Patented July 12, 1938

2,123,674

UNITED STATES PATENT OFFICE 2,123,674

PROPORTIONAL SCALE

Gerald Gottlieb, New York, N. Y., assignor to Louis Kovel, New York, N. Y.

Application June 27, 1936, Serial No. 87,613

2 Claims. (Cl. 33—98)

This invention relates to a proportional scale, more particularly to a measuring device to be employed in determining proportional dimensions.

My invention is concerned primarily with the provision of a device to be employed by printing or typographical establishments such as newspapers to arrange for the set-up of type, "cuts" and combinations thereof.

It has been the practice in the "set-up" of type or other typography for printing to give to the "set-up" man instructions or directions to allow for the assembly of half tone cuts or the like to be assembled with the printing, type, photograph or other illustrating material. Frequently the space to be allowed in the typography is by reference to the photograph or print which is to be reduced or enlarged in dimension before embodying the "cut" therefore in the type "set-up".

The typography assembly usually proceeds independently of the production of the "cuts" of the illustrated subject matter and it is required that the dimensions be known of the reduced or enlarged illustrated subject matter in order that the type "set-up" may have appropriate provision for the illustrated subject matter.

While the "set-up" man for the type may be quickly informed of one dimension in the enlargement or reduction, in order to retain the space for the illustrated subject matter of proportional dimensions it has been the practice to actually carry out the calculation and measurements upon the proof which is to be enlarged or diminished, with the consequent loss and consumption of time, in addition to the requirement frequently to mar the photograph or illustrated subject matter from which the enlargement or reduction is made.

Accordingly it is an object of my invention to provide a measuring device or scales from which proportional dimensions may be obtained quickly, conveniently and accurately so that the type setter, "set-up" man or typographer may obtain figures to allow space for half tone cuts or the like for illustrated subject matter and which accurately gives the proportional dimensions whether the illustrated subject matter is to be reduced or magnified in size. Further objects of my invention reside in the provision of an inexpensive measuring device or proportional scale whereby illustrated subject matter may be arranged to obtain proportional dimensions where it is desired to reduce or magnify any illustration and which permits the procurement of such calculations quickly and conveniently without making such calculation upon the work from which these calculations are originally obtained. Thus it is contemplated by my invention to provide a proportional scale wherein proportional dimensions of any illustrated subject matter can be obtained while viewing the subject matter so that fragments of the illustration may be chosen and the calculations made as to such fragments where enlargement or reduction of such fragment may be desirable.

To attain these objects and such further objects as may appear herein or be hereinafter pointed out, I make reference to the accompanying drawing forming a part hereof in which:

Figure 1 is a plan view illustrating my device; Figure 2 is a section taken on the line 2—2 of Figure 1; Figure 3 is a section taken on the line 3—3 of Figure 1; Figure 4 illustrates my invention for obtaining proportional dimensions for an enlargement; Figure 5 illustrates my invention for obtaining proportional dimensions for a reduction.

Making reference to the drawing my device in its preferred form constitutes 3 scales, 2 of which are pivotally connected to each other and a third of which is pivotally and slidably connected to one of the first mentioned scales. In the illustration I provide a primary scale 10 which is preferably formed of transparent material such as celluloid, "Cellophane", cellulose acetate or other transparent plastic material. This scale is provided with units of measure such as inches and fractions thereof laid off along a medial reference or center line 11 running longitudinally of the scale 10. It is preferred that the scale markings be applied to the material from which the scale is formed in "bold" lines and therefore "hair" lines 12 are inscribed across the full width of the scale 10 through the "bold" lines of the scale markings 13, which "hair" lines lie at right angles to the medial line 11.

Connected to the scale 10 I provide the scale 14 preferably made of similar transparent material as the scale 10 and these scales are connected to each other by passing a set screw 15 adjacent its end 15a connecting the same to the scale 10 at its zero point, to the scale along the medial or center line 11 of the scale 10. The set screw 15 passes also through the scale 14 on a medial or center line 16 inscribed along the length of the scale 14. It will be understood that the set screw 15 passing through the scale 10 and 14 permanently connects these members for free pivotal movement upon relief of the tension of the set screw but a relatively rigid angular position may be assumed by tightening the set screw 15 against the screw 18 which has been riveted to the scale 10 through the zero point of said scale on the medial line 11 of the scale 10.

I then provide a scale 19 which is inscribed medially and longitudinally thereof with a line 20 along which the scale markings 17 are provided in "bold" lines in some unit of measure such as inches and fractions thereof. Through the scale markings 17 I inscribe "hair" lines 21 running through the scale markings at right angles to the medial or center line 20. It is to be understood that the scale 19 is preferably made of transparent material as already described in connection with scales 10 and 14. Adjacent the end 22 of the scale 19 I provide a slide 23 which is arranged to envelop and freely slide upon the scale 14. The slide 23 has its branch 24 disposed between the scales 14 and 19 and at a point of the branch 24 coincident with the medial or center line 16, there is provided a rivet 25 whose axial line passes through the scale 19 at a point which coincides with the zero point on the scale 19 and the medial or center line 20 thereof. The connection of the rivet 25 to the scale 19 permits of an angular as well as a slidable connection of the scales 14 and 19 to each other.

With the arrangement of the scales as provided the device is ready for its intended purpose of determining proportional calculations.

By reference to Figures 4 and 5 exemplification will be made to the manner of use and for this purpose the following will appear:

In Figure 4 a photograph (A) is shown from which it may be desired to obtain proportional dimensions for an enlargement.

To accomplish this the scale 10 is arranged so that the medial or center line 11 coincides with the top edge 26 of the photograph. The zero point of the scale is also made coincident with the corner 27 of the photograph. Thereupon the scale 14 is adjusted so that the medial or center line 16 thereof lies diagonally across the corner 27 and the lower right hand corner 28 to coincide with both these points. With the scales 10 and 14 so positioned the scale 19 may be slidingly disposed along the length of the scale 14 to arrange the same so that the "hair" lines 21 and the scale 19 coincide with the medial or center line 11 on the scale 10 to cause the members 10 and 19 to lie at right angles to each other. It will thus be observed that when the scales 10 and 19 are positioned at right angles to each other a reading may be obtained of the points of intersection of the scales 10 and 19 respectively, along the medial or center lines 11 and 20 respectively, to thereby obtain dimensional readings on the scales 10 and 19 respectively, giving dimensions proportional to the photograph (A) as to its width and length. Thus also it will be observed that if the "set-up" man or typographer prescribes a definite width for the enlargement, the unknown factor, i. e., length of the enlargement may be obtained by reading the scale 19 to determine the intersection of the medial or center line 20 on the scale 19 in respect of the medial line 11 of the scale 10 when the scales 10 and 19 lie at right angles to each other. Thus also rapid calculations may be made for any unknown dimensions for an enlargement and by adjusting the scale 19 at right angles to the scale 10 along any prescribed point on the scale 10 while maintaining the identical angular position of the scale 10 to the scale 14, calculations will be obtained along the scale 19 by reading the intersection of the medial line 11 of the scale 10 on the medial line 20 of the scale 19.

Should it be desirable to segregate from the photograph (A) a portion of the photograph, the photograph may be inscribed with some rectangle outlining the segregated fragment and the proportional scales may be arranged along this rectangle by a method of positioning the scales and then enlargement calculations may be made in the same manner.

In Figure 5 I have illustrated a manner of use to the proportional scales constituting my invention for purposes of determining proportional dimensions for a reduced photograph or the like. In this illustration the photograph (B) has arranged thereover the scale 10 so that the zero point of the scale is coincident with the corner 29 and the medial or center line 11 lies coincident with the upper edge 30 of the photograph.

In this position the scale 14 is then positioned so that its medial or center line 16 intersects the corner 31 of the photograph. The angular arrangement of the members 10 and 14 having been determined, the scale 19 may be moved along the scale 14 until a pre-determined dimension along the scale 10 is reached when holding the scale 19 at right angles to the scale 10 as determined by the coincidence of the "hair" lines 21 and the medial or center line 11 of the scale 10 or vice versa by an intersection of a "hair" line 12 with the medial line 20 of the scale 19 where these reference markings coincide with each other. When this position has been determined, a reading may be made on the scale 19 and the new dimension for the reduced photograph obtained from the zero point on the scale 19 to the point where on one of the "hair" lines 21 coincides with the medial or center line 11 on the scale 10.

It will thus be observed that by the device provided proportional dimensions may be obtained for any enlargement or any reduction and that the adjustment of these members may be accomplished without marring or disfiguring the photograph.

It will further be observed that fragmental portions of the photograph may be given consideration to thereby segregate some portion of the photograph which it may be desired to enlarge or reduce in size and determine the proportional dimensions of the enlargement or reduction. It will also be observed that if a prescribed dimension is required for the enlargement or reduction the proportional scales offer quick and ready means for ascertaining the unknown proportional enlarged or reduced dimensions of a corresponding enlargement or reduction.

While I have described my invention as having primary utility in connection with obtaining proportional dimensions in the field of typography, it will be understood that my invention has a wider field of application and my invention is not to be restricted in scope as to the field of utility but is considered to have broader phases of utility within the scope of the claims appended hereto.

Having thus described my invention and illustrated its use, what I claim as new and desire to secure by Letters Patent is:

1. Proportional scales comprising three longitudinal members of substantially transparent material, center lines substantially medially and longitudinally inscribed on said members, one of said members comprising a primary member, pivotal means connecting said primary member to one of said other members, a slide on said primary member, a pivot carried by said slide to which the third of said members is connected, said pivotal means and pivot connecting said members to each other along the center lines, the ends of said members connected to said primary member being free to slide or pivot and including means visible when said members are overlapping to indicate a right angular position of these members to each other comprising "hair" lines inscribed at right angles to the center lines whereby superimposition of the "hair" lines and center lines on the corresponding overlapping members will determine the rectangular position of these members to each other.

2. Proportional scales comprising three longitudinal members of substantially transparent material, center lines substantially medially and longitudinally inscribed on said members, one of said members comprising a primary member, a second of said members being connected to said primary member for angular adjustment relative thereto, and means for setting such members in the angular adjustment, the third of said members including pivotal means mounted upon a slide thereby being slidably and pivotally connected to said primary member said second and third members being free at their opposite ends and including means to indicate a right angular position of the second and third members to each other along their lengths at various intersecting positions, the members being connected to each other at points on the center lines of connected members.

GERALD GOTTLIEB.